United States Patent
Hicks

(10) Patent No.: US 9,473,987 B1
(45) Date of Patent: Oct. 18, 2016

(54) COMBINING BANDWIDTH FROM MULTIPLE CELLULAR CONNECTIONS INTO A SINGLE WLAN NETWORK

(71) Applicant: INTERNATIONAL BUSINESS MACHINES CORPORATION, Armonk, NY (US)

(72) Inventor: Scott D. Hicks, Underhill Center, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/939,094

(22) Filed: Nov. 12, 2015

(51) Int. Cl.
*H04W 72/04* (2009.01)
*H04W 84/12* (2009.01)
*H04W 28/20* (2009.01)

(52) U.S. Cl.
CPC ......... *H04W 28/20* (2013.01); *H04W 72/0446* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,720,098 B1 * | 5/2010 | Allen | ..... | H04W 28/20 370/464 |
| 8,644,255 B1 * | 2/2014 | Burcham | ..... | H04W 88/06 370/331 |
| 9,197,579 B2 * | 11/2015 | Martini | ..... | H04L 47/76 |
| 2009/0279520 A1 * | 11/2009 | Maki | ..... | H04W 12/06 370/338 |
| 2013/0170451 A1 * | 7/2013 | Krause | ..... | H04L 69/14 370/329 |
| 2014/0122656 A1 | 5/2014 | Baldwin et al. | | |
| 2014/0280990 A1 * | 9/2014 | Dove | ..... | H04L 65/601 709/228 |
| 2015/0282195 A1 * | 10/2015 | Farhadi | ..... | H04W 72/085 370/229 |
| 2016/0007387 A1 * | 1/2016 | Adib | ..... | H04W 76/02 370/329 |

OTHER PUBLICATIONS

Anonymous; "Connectify Hotspot", http://www.connectify.me/; Accessed Jun. 19, 2015, 5 pages.
Anonymous; "Load Balance Broadband Router TL-R470T+", TP-LINK; http://www.tp-link.com/en/products/details/cat-4910_TL-R470T%2B.html; First Accessed on or about May 16, 2015; 3 pages.

* cited by examiner

*Primary Examiner* — Robert C Scheibel
(74) *Attorney, Agent, or Firm* — John Pivnichny; Andrew M. Calderon; Roberts Mlotkowski Safran Cole & Calderon, P.C.

(57) ABSTRACT

A computer-implemented method comprising: receiving an instruction to aggregate cellular bandwidth of a user device with the cellular bandwidth of one or more participating user devices; appending a shared character string to a network name of the user device based on receiving the instruction; scanning for wireless local area networks (WLANs) after appending the shared character string; identifying one or more WLAN networks with the network names having the shared character string, where the one or more WLAN networks are hosted by the one or more participating user devices; connecting to a particular WLAN network, of the one or more WLAN networks via a WLAN interface of the user device; combining bandwidth from the cellular interface of the user device with the bandwidth from the WLAN interface of the user device; and hosting a WLAN network providing a sum of the bandwidth from the WLAN interface and the cellular interface.

17 Claims, 5 Drawing Sheets

COMBINING BANDWIDTH FROM MULTIPLE CELLULAR CONNECTIONS INTO A SINGLE WLAN NETWORK

BACKGROUND

The present invention generally relates to bandwidth aggregation, and more particularly, to bandwidth aggregation from multiple cellular devices.

A user device can access a cellular network for connectivity to external networks (e.g., the Internet). The cellular network establishes a bearer connection with the user device, and provides the user device with a certain amount of network bandwidth. The amount of network bandwidth is limited by the bearer policies set by a service provider of the cellular network. A user device may host a WiFi network (e.g. a WiFi "hotspot") in which the cellular connection of the user device is shared with companion devices (e.g., another user device, such as a laptop, tablet device, etc.).

The bandwidth of the companion device is limited to the bandwidth of the cellular connection of the user device. A group users may need to use their companion devices to access an ad hoc WiFi hotspot with greater throughput than any of their cellular devices can provide individually. For example, a team of co-workers may need to connect their laptop PCs or tablets to a local WiFi network for collaborative work, and the team may need that local WiFi network to have high speed Internet access to be shared by all of the laptops and tablets. There currently is no known application or algorithm that enables users to voluntarily and automatically combine the wireless wide area broadband (e.g., cell phone) bandwidth of their individual devices into a single higher speed connection to the Internet that can be made available for a WiFi hotspot.

SUMMARY

In an aspect of the invention, a computer-implemented method includes: receiving, by a user device connected to a cellular network via a cellular interface of the user device, an instruction to aggregate cellular bandwidth of the user device with the cellular bandwidth of one or more participating user devices; appending, by the user device, a shared character string to a network name of the user device based on receiving the instruction; scanning, by the user device, for wireless local area networks (WLANs) after appending the shared character string; identifying, by the user device, one or more WLAN networks with the network names having the shared character string, where the one or more WLAN networks are hosted by the one or more participating user devices; connecting, by the user device, to a particular WLAN network, of the one or more WLAN networks via a WLAN interface of the user device; combining, by the user device, bandwidth from the cellular interface of the user device with the bandwidth from the WLAN interface of the user device; and hosting, by the user device, a WLAN network providing a sum of the bandwidth from the WLAN interface and the cellular interface.

In another aspect of the invention, there is a computer program product for aggregating bandwidth from a plurality of cellular connections. The computer program product includes a computer readable storage medium having program instructions embodied therewith. The program instructions are executable by a user device to cause the user device to: receive an instruction to aggregate cellular bandwidth of the user device with the cellular bandwidth of one or more participating user devices; append a shared character string to a network name of the user device based on receiving the instruction; host a wireless local area network (WLAN) after appending the shared character string; disconnect devices from the WLAN except for a particular one of the one or more participating user devices having a network name with the shared character string and a current sequence character string; scan for WLANs hosted by other devices; identify one or more WLAN networks hosted by the other devices with the network names having the shared character string; connect to a particular WLAN network, of the one or more WLAN networks via a WLAN interface of the user device; and combine bandwidth from a cellular interface of the user device with the bandwidth from the WLAN interface of the user device, where the WLAN hosted by the user device provides a sum of the bandwidth from the WLAN interface and the cellular interface.

In another aspect of the invention, a system comprising: a user device comprising a CPU, a computer readable memory and a computer readable storage medium associated with a computing device; program instructions to receive an instruction to aggregate cellular bandwidth of the user device with the cellular bandwidth of a participating user device; program instructions to append a shared character string to a network name of the user device based on receiving the instruction; program instructions to scan for wireless local area networks (WLANs) after appending the shared character string; program instructions to identify a WLAN hosted by the participating user device based on a network name of the WLAN having the shared character string; program instructions to connect to the WLAN network via a WLAN interface of the user device; program instructions to combine bandwidth from a cellular interface of the user device with bandwidth from the WLAN interface of the user device; and program instructions to host a WLAN network providing a sum of the bandwidth from the WLAN interface and the cellular interface, where the bandwidth from the WLAN interface includes the bandwidth from a cellular interface of the participating user device. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
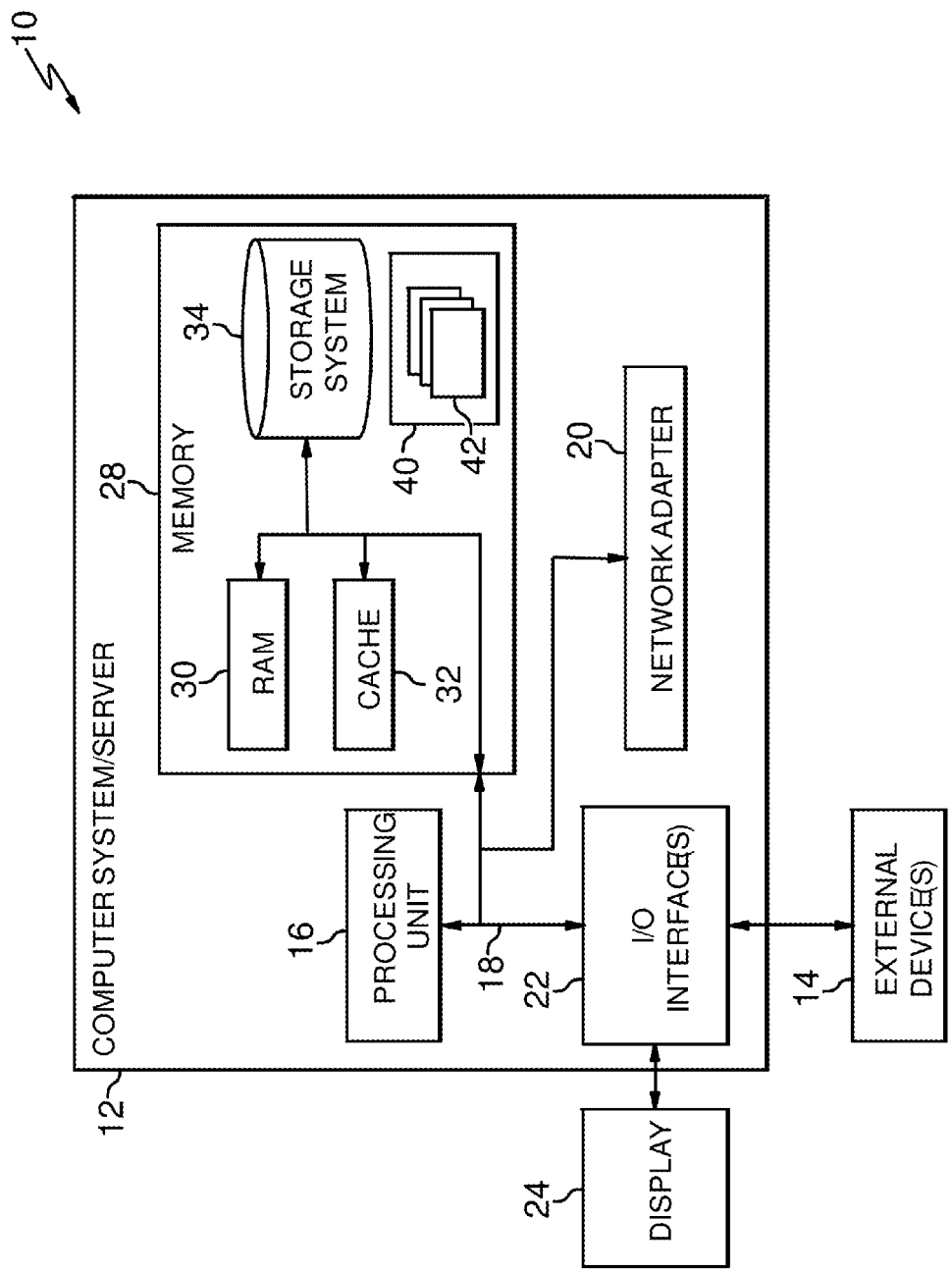
FIG. 1 an illustrative environment for implementing the steps in accordance with aspects of the invention.

The present invention generally relates to bandwidth aggregation, and more particularly, to bandwidth aggregation from multiple cellular devices. In accordance with aspects of the present invention, an application is provided that automatically combines the cellular data bandwidth of two or more mobile devices into a single faster "pipe" of bandwidth that is made available for a WiFi hotspot. Aspects of the present invention include an algorithm to enable multiple devices to auto-negotiate the sequencing, labeling, and aggregation of the nodes that make up the combined bandwidth.

In aspects of the invention, bandwidth from multiple user devices (e.g., cellular user devices, such as mobile cellular phones that access a cellular network) is aggregated, and the aggregated bandwidth is made available to companion devices via a WiFi network implemented by one of the multiple user devices. Advantageously, companion devices can connect to a single WiFi network, and have access to an aggregated amount of network bandwidth provided by multiple user devices. As an illustrative example, a group of users, each having their own user devices, may aggregate the cellular bandwidth from each user device to create a WiFi network having the aggregated cellular bandwidth. Companion devices can then be connected to the WiFi network so that the companion devices have access to a greater amount of bandwidth for collaborative work or other applications requiring greater bandwidth than a single cellular connection could provide. In embodiments, service agreements within an individual's cellular service provider could impose limitations on how cellular connections are combined, and how much data may be utilized via a combined cellular connection.

As an example, a group of users may need to use their companion devices to access an ad hoc WiFi hotspot with greater throughput than any of their cellular devices can provide individually. For example, a team of co-workers may need to connect their laptop PCs or tablets to a local WiFi network for collaborative work, and the team may need that local WiFi network to have high speed Internet access to be shared by all of the laptops and tablets. A second example is that a classroom in a remote location may not have access to high speed wired Internet access. The teacher could direct the students to share their bandwidth so that the classroom would have access to high bandwidth applications. As described herein, an auto-negotiation process is implemented in order to aggregate cellular bandwidth from multiple user devices and provide the aggregated bandwidth in a single WiFi network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable cloud computing node and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computer infrastructure 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
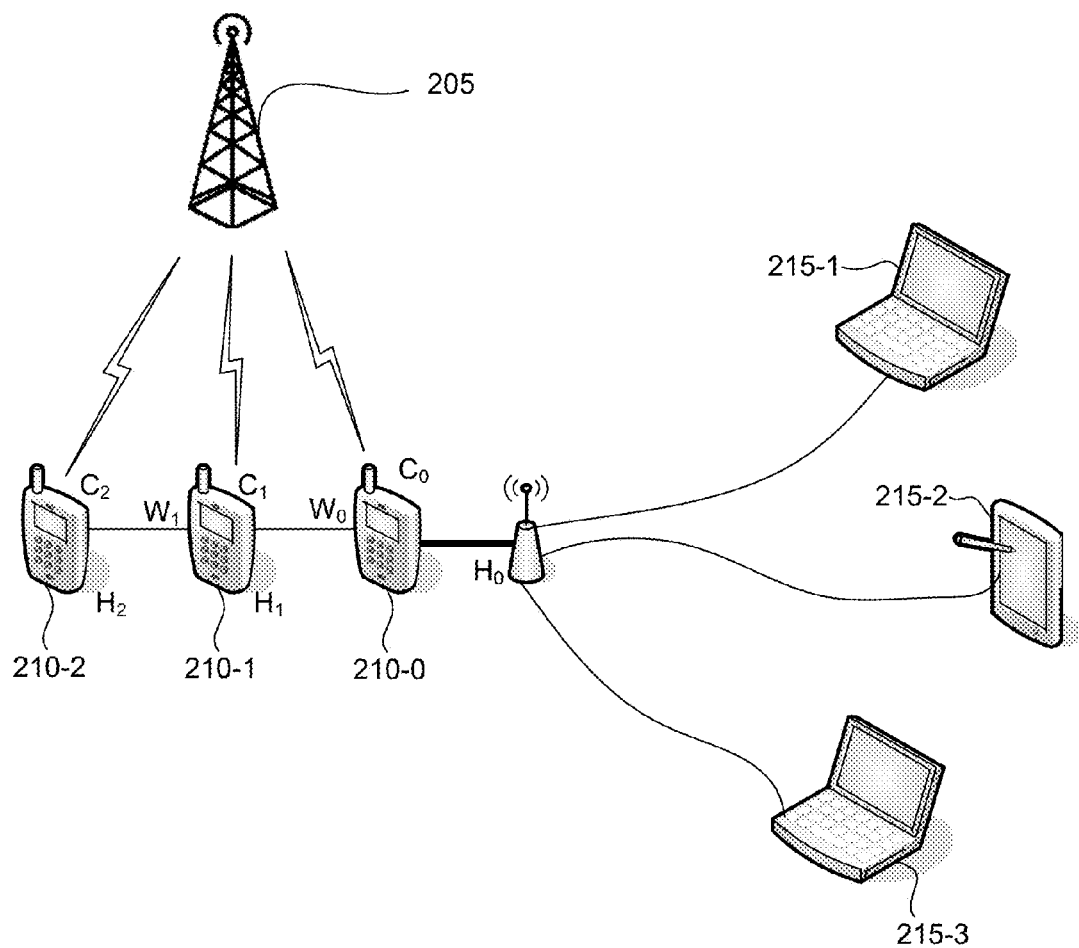
FIG. 2 shows an overview of an example implementation in accordance with aspects of the present invention.

FIG. 2 shows an overview of an example implementation in accordance with aspects of the present invention. As shown in FIG. 2, user devices 210 (e.g., user devices 210-0, 210-1, and 210-2) may each connect to a cellular network, e.g., via a cellular network device 205. The cellular network device 205 may be, for example, an eNodeB (eNB), cellular tower, or the like. Each user device 210-0, 210-1, and 210-2 has access to a limited amount of cellular bandwidth. For example, the amount of cellular bandwidth may be defined by bearer policies associated with the cellular network, and/or may be limited based on the radio technology of a cellular radio used to connect to the cellular network device 205. The example shown in FIG. 2 and discussed below includes three cellular devices. Implementations may include any number of cellular devices from two to a much larger number.

As further shown in FIG. 2, the user devices 210-0, 210-1, and 210-2 may be "daisy chained" to one another in order to aggregate the cellular bandwidth from each user device and create a single WiFi network (also referred to as a WiFi "hotspot" or a "hotspot network") having the aggregate cellular bandwidth across the user devices 210-0, 210-1, and 210-2. Companion devices 215-1, 215-2, and 215-3 may then connect to the WiFi network and have access to the aggregate cellular bandwidth. For example, multiple companion devices may simultaneously connect to the WiFi network inside of one parent session. Load balancing may direct the traffic to the sub-connection that is least utilized at the moment. Alternatively, a single companion device may connect to the WiFi network, and the amount of bandwidth available is the sum of the bandwidth of the individual cellular connections. As described herein, each user device 210 may include one more of the components in FIG. 1, to auto-negotiate the connections used to aggregate the cellular bandwidth into a single WiFi network.

Each of user devices 210-0, 210-1, and 210-2 has two input data interfaces and one output data interface. For example, each user device has a cellular interface, and a WiFi input interface. The cellular interface is used to connect with the cellular network device 205, and the WiFi input interface is used to scan and connect to a wireless LAN (WLAN), such as a WiFi network. Thus, a user device 210 may have two input connections (e.g., a connection with a cellular network and a connection with a WiFi network). The output data interface (e.g., a "hotspot" interface) is used to create a WiFi network (e.g., a WiFi "hotspot"). The bandwidth of the WiFi hotspot is the sum of the bandwidth from the two input connections.

In the example of FIG. 2, cellular interfaces for the user devices 210-0, 210-1, and 210-2 are denoted as $C_0$, $C_1$, and $C_2$, respectively. The WiFi input interfaces for user devices 210-0, 210-1, and 210-2 are denoted as $W_0$, $W_1$, and $W_2$, respectively. The output data interface (i.e., hotspot interface) for the user devices 210-0, 210-1, and 210-2 are denoted as $H_0$, $H_1$, and $H_2$, respectively. As previously described, each of the user devices 210-0, 210-1, and 210-2 connect to the cellular network device 205 (e.g., using $C_0$, $C_1$, and $C_2$, respectively).

As shown in FIG. 2, the user device 210-2 is connected to the user device 210-1, and the user device 210-1 is connected to the user device 210-0. The user device 210-0 hosts an aggregated WiFi network (e.g., using its hotspot interface $H_0$). For example, the hotspot interface of the user device 210-2 (H2) hosts a WiFi network with which the user device 210-1 connects, using a WLAN interface (WiFi interface) of user device 210-1 (W1). Similarly, the hotspot interface of the user device 210-1 (H1) hosts a WiFi network with which the user device 210-0 connects, using the WiFi interface of user device 210-0 (W0). The user device 210-0 may host a WiFi hotspot (using H0) that has a bandwidth that is the sum of the bandwidth from the connection of C0 and the connection of W0 (e.g., the sum of the bandwidth of the connections of C1 and C2). Thus, the bandwidth of the WiFi network implemented by H0 is the sum of the bandwidth of the C0, C1, and C2 connections.

Figure 3:
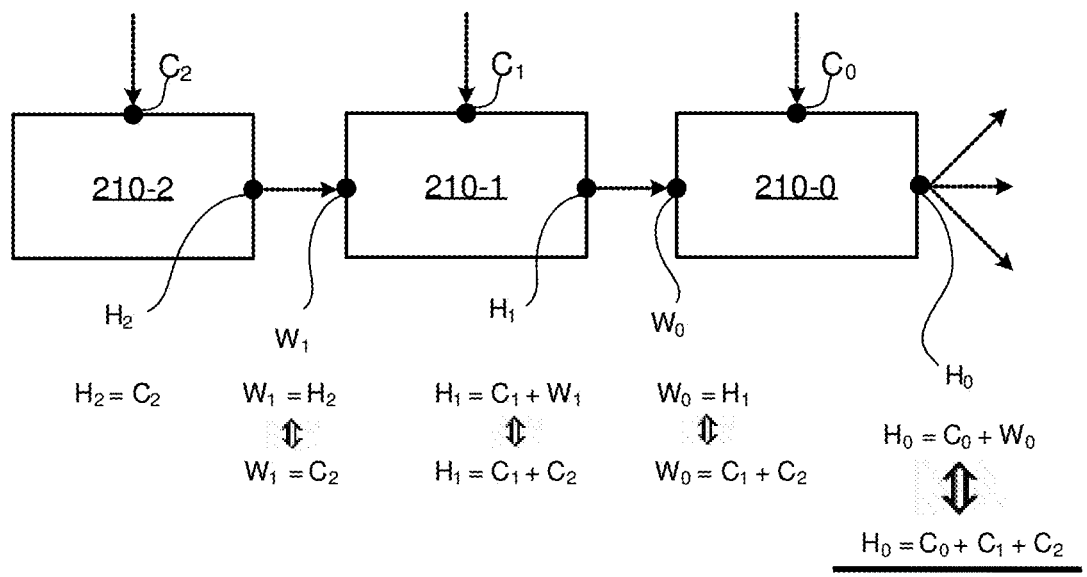
FIG. 3 shows a diagram of aggregating bandwidth from multiple cellular connections in accordance with aspects of the present invention.

FIG. 3 shows a diagram of aggregating bandwidth from multiple cellular connections in accordance with aspects of the present invention. As shown in FIG. 3, user device 210-2 has an input cellular connection using C2, and hosts a WiFi hotspot using H2. The amount of bandwidth provided by H2 is equal to the bandwidth of the C2 connection. User device 210-1 has an input cellular connection using C1, and input WiFi connection using W1. For example, user device 210-1 connects to the WiFi hotspot implemented by user device 210-2. The user device 210-1 hosts a WiFi hotspot using H1. The amount of bandwidth provided by H1 is equal to the sum of the bandwidth of the C1 connection, and the bandwidth of the W1 connection, which, in this illustrative example, is the bandwidth provided by the H2 connection, which is the bandwidth provided by the C1 connection. Thus, the amount of bandwidth provided by H1 is the sum of the bandwidth of the C1 and C2 connections.

User device 210-0 has an input cellular connection using C0, and input WiFi connection using W0. For example, user device 210-0 connects to the WiFi hotspot implemented by user device 210-1. The user device 210-0 hosts a WiFi hotspot using H0. The amount of bandwidth provided by H0 is equal to the bandwidth of the C0 connection, and the bandwidth of the W0 connection, which, in this illustrative example, is the bandwidth provided by the H1 connection, which is the sum of the bandwidth provided by the C1 connection and C2 connection. Thus, the amount of bandwidth provided by the H0 connection is the sum of the bandwidth provided by the C0, C1, and C2 connections. In embodiments, one or more companion devices 215 may connect to the hotspot network implemented by user device 210-0, thereby having the aggregate bandwidth of the cellular connections across user device 210-0, 210-1, and 210-2.

Figure 4:
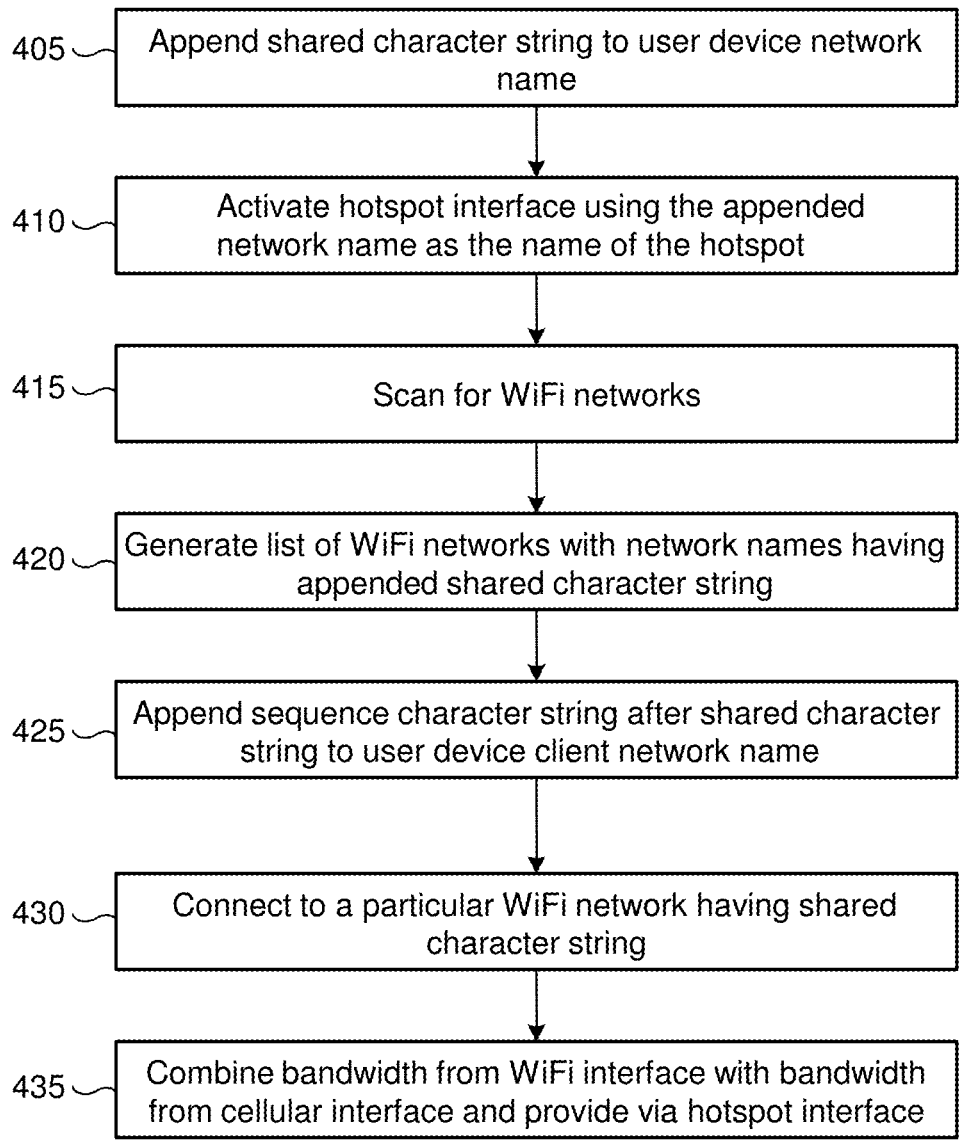
FIGS. 4 and 5 show example flowcharts for combining bandwidth from multiple participating user devices, and implementing a WiFi hotspot with the combined bandwidth.
Figure 5:
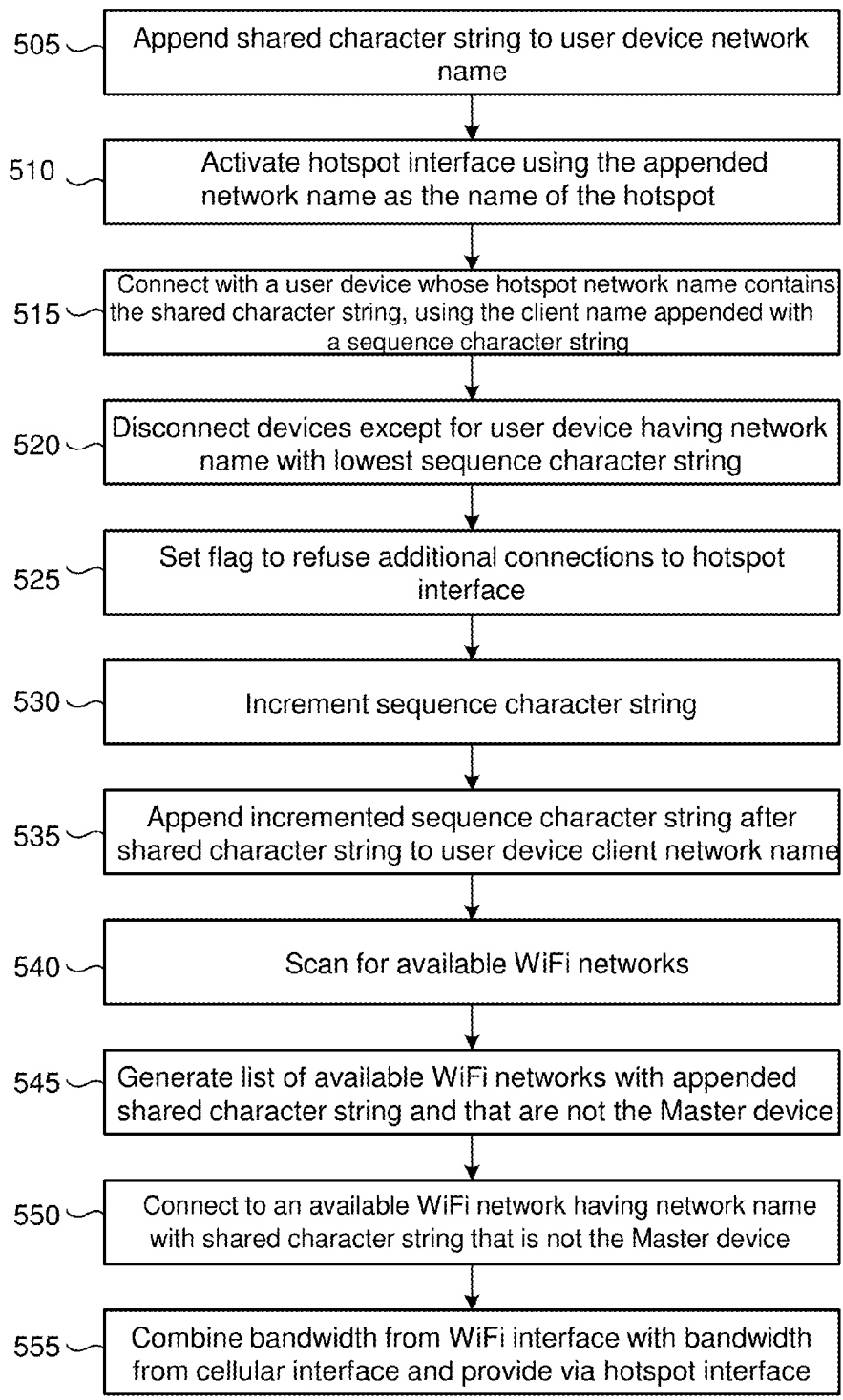

FIGS. 4 and 5 show example flowcharts for combining bandwidth from multiple participating user devices, and implementing a WiFi hotspot with the combined bandwidth. The steps of FIGS. 4 and 5 may be implemented in the environments of FIGS. 1 and 2, for example, and are described using reference numbers of elements depicted in FIGS. 1 and 2. As noted above, the flowchart illustrates the architecture, functionality, and operation of possible implementations of systems, methods, and computer program products according to various embodiments of the present invention.

At step 405, a shared character string is appended to the network name of a user device 210. For example, the shared character string is appended when the user device 210 receives an instruction from a user of user device 210 to combine cellular connections from multiple other participating user devices 210, and host a WiFi hotspot with which companion devices may connect. In embodiments, the user device 210 may receive this instruction via a user interface associated with a connection aggregation application used to facilitate the aggregation of multiple cellular connections. This connection aggregation application may be used to permit other user devices 210 to have their cellular connections aggregated.

As an illustrative example, users of three user devices 210 (e.g., user device 210-0, user device 210-1, and user device 210-2) may open the application and select to participate in a cellular connection aggregation network. One of the user devices 210 may be designated as the "master" user device 210 that hosts a hotspot having the bandwidth of aggregated cellular connections across the user device 210-0, user device 210-1, and user device 210-2. In this example, assume that the user device 210-0 is the "master" user device, and the user devices 210-1 and user device 210-2 are participating user devices. The participating user devices may receive instructions from their respective users (e.g., via the application) to combine cellular connections and with the master user device. For example, the participating user devices may input or select a network name of the master user device. The steps of FIG. 4 may be performed by the master user device as opposed to the participating user devices.

In embodiments, user device 210-0 may append a shared character string to the network name of user device 210-0 to indicate that user device 210-0 is sharing its cellular connection for aggregation. Also, user devices 210-1 and user devices 210-2 may append a shared character string to their network names. As an example, if the network name for the user device 210-0 is currently "User A's Phone" the user device 210-0 may append the shared character string "Shared_cell" thus updating the network name of user device 210-0 to "User A's Phone_Shared_cell".

In embodiments, the shared character string may be a random string of characters or a custom string of characters that is then shared privately among participating user devices 210. For example, the connection aggregation application may be used to permit a user to customize the shared character string, or randomly generate a shared character string. Once a character string has been selected (either a customized or randomly generated string), the connection aggregation application running on the master user device 210 may privately transmit information identifying the shared character string to the participating user devices 210. For example, the master user device 210 may send a text message with the shared character string to the participating user devices 210, and the connection aggregation application may use an application programming interface (API) to access the text message. For example, the connection aggregation application of the participating user devices 210 may access text messages sent by the content aggregation application of the master user device 210. Alternatively, the shared character string may be privately communicated between the master user device 210 the participating user devices 210 using some other technique. For example, users may manually enter a shared character string that the users have mutually selected. The shared character string may be custom or random so that other user devices 210 may not be accidentally construed as participating user devices 210.

At step 410, the user device 210-0 activates its hotspot interface to create a WiFi network. The name of the WiFi network is the updated network name of the user device 210-0 (e.g., "User A's Phone_Shared_cell"). Other participating user devices 210-1 and 210-2 may also create WiFi networks with network names having the shared character strings.

At step 415, the user device 210-0 scans for WLANs (WiFi networks) using its WiFi interface. At step 420, the user device 210-0 generates a list of WiFi networks with names having the appended shared character string (e.g., WiFi networks hosted by the other participating user devices 210-1 and 210-2).

At step 425, the user device 210-0 appends a sequence character string after the shared character string to its client network name. For example, the user device 210-0 may append the sequence character string "_0" thereby updating the client network name of the user device 210-0 to "User A's Phone_Shared_cell_0". The sequence character indicates that user device 210-0 will share its bandwidth when it connects to a WiFi network hosted by a participating user device 210.

At step 430, the user device 210-0 connects to a particular WiFi network having the shared character string. For example, the user device 210-0 may connect to one of the WiFi networks in the list of WiFi networks generated at step 420. In embodiments, the user device 210-0 may use any number of selection techniques to select a particular one of the WiFi networks with which to connect. For example, the user device 210-0 may randomly select one of the WiFi networks, or may select the WiFi network having the strongest signal. The user device 210-0 may connect to the WiFi network using its WiFi interface, and using its client network name that includes the shared character string and the sequence character string.

At step 435, the user device 210-0 may combine the bandwidth from the WiFi interface with the bandwidth from the cellular interface, and provide the bandwidth via the hotspot interface. For example, the user device 210-0 may combine the bandwidth using any number of conventional bandwidth aggregation and load balancing techniques. As a result, the WiFi hotspot created by the user device 210-0 combines the bandwidth from multiple cellular connections, and companion devices 215 may connect to the WiFi hotspot to utilize the combined or aggregated bandwidth.

FIG. 5 shows an example flowchart for auto-negotiating connections for bandwidth aggregation between participating user devices. The steps of FIG. 5 may be performed by a participating user device 210 as opposed to being performed by a master user device 210. As an example, a participating user device 210-1 may perform the steps of FIG. 5.

At step 505, the user device 210-1 appends a shared character string to the network name of the user device 210-1 (e.g., in a similar manner as described above with respect to step 405 of FIG. 4). For example, assume that the shared character string is "_Shared_cell" and that the network name is "User B's cell phone". As a result, the updated network name of user device 210-1 is "User B's cell phone_Shared_cell".

At step 510, the user device 210-1 activates its hotspot interface (e.g., to host a WiFi network). The name of the WiFi network is the updated network name generated at step 505 (e.g., "User B's cell phone_Shared_cell"). At step 515, the user device 210-0 may connect as a client to the user device 210-1 whose network name has the shared character string. The user device 210-0 connects using an appended sequence character string to the WiFi network hosted by user device 210-1. In this example, the user device 210-1 may connect the user device 210 whose client network name is "_Shared_cell_0" (e.g., user device 210-0). That is, user device 210-0 may connect to the WiFi network hosted by user device 210-1. For a subsequent connection, user device 210-1 may connect to a WiFi network hosted by user device 210-2, and so on.

At step 520, the user device 210-1 may disconnect all devices except for the user device 210 whose network name has the current sequence character string from the WiFi network implemented by user device 210-1. This is performed to prevent other devices from utilizing bandwidth provided by the hotspot interface of user device 210-1.

At step 525, the user device 210-1 may set a flag to refuse additional connections to its hotspot interface (e.g., to the WiFi network implemented to by the user device 210-1). This is performed to prevent other devices from utilizing bandwidth provided by the hotspot interface of user device 210-1.

At step 530, the user device 210-1 may increment the sequence character string (e.g., of user device 210-0). In this example, the sequence character string is incremented to "_1". At step 535, the incremented character string is appended after the shared character string of the client network name of the user device 210-1. In this example, the updated client network name of user device 210-1 is "User B's cell phone_Shared_cell_1".

At step 535, the user device 210-1 appends an incremented sequence character string after the shared character string to the client network name of the user device.

At step 540, the user device 210-1 may scan for WiFi networks. At step 545, the user device 210-1 generates a list of available WiFi networks with appended shared character strings that are not the master device.

At step 550, the user device 210-1 may connect to a particular WiFi network having a network name with the shared character string that is not the master device. For example, the user device 210-0 may connect to one of the WiFi networks in the list of WiFi networks generated at step 545. As described above with respect to step 430 of FIG. 4, the user device 210-1 may use any number of selection techniques to select a particular one of the WiFi networks with which to connect. For example, the user device 210-1 may randomly select one of the WiFi networks, or may select the WiFi network having the strongest signal. The user device 210-1 may connect to the WiFi network using its WiFi interface.

At step 555, the user device 210-1 may combine the bandwidth from its WiFi interface with the bandwidth from its cellular interface, and provide the combined bandwidth via the hotspot interface. For example, the user device 210-1 may combine the bandwidth using any number of conventional bandwidth aggregation and load balancing techniques. As a result, the WiFi hotspot created by the user device 210-1 combines the bandwidth from multiple interfaces, and provides the combined bandwidth towards a master user device 210.

The process of FIG. 5 may be repeated for any number of participating user devices 210. As a result, multiple user devices 210 may be "daisy chained" via their respective WiFi and hotspot interfaces, and the cellular connections are aggregated across all participating user devices 210. Further, the connections between multiple user devices 210 are automatically negotiated in accordance with the processes of FIGS. 4 and 5.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for aggregating cellular connections, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a user device connected to a cellular network via a cellular interface of the user device, an instruction to aggregate cellular bandwidth of the user device with the cellular bandwidth of one or more participating user devices;
appending, by the user device, a shared character string to a network name of the user device based on receiving the instruction;
scanning, by the user device, for wireless local area networks (WLANs) after appending the shared character string;
identifying, by the user device, one or more WLAN networks with the network names having the shared character string, wherein the one or more WLAN networks are hosted by the one or more participating user devices;
connecting, by the user device, to a particular WLAN network, of the one or more WLAN networks via a WLAN interface of the user device;
combining, by the user device, bandwidth from the cellular interface of the user device with the bandwidth from the WLAN interface of the user device; and
hosting, by the user device, a WLAN network providing a sum of the bandwidth from the WLAN interface and the cellular interface; and
appending a sequence character string to the network name of the user device after the shared character string based on identifying the one or more WLAN networks.

2. The method of claim 1, further comprising selecting the particular WLAN network based on signal strength associated with the particular WLAN network, wherein connecting to particular WLAN network includes selecting the particular WLAN network.

3. The method of claim 1, further comprising randomly selecting the particular WLAN network, wherein connecting to particular WLAN network includes randomly selecting the particular WLAN network.

4. The method of claim 1, further comprising generating the shared character string by randomly selecting characters or receiving a custom character string from a user of the first user device, wherein appending the shared character string is based on generating the shared character string.

5. The method of claim 4, further comprising sending the shared character string to the one or more participating user devices.

6. The method of claim 1, further comprising receiving the shared character string from a particular one of the one or more participating user devices, wherein appending the shared character string is based on receiving the shared character string.

7. The method of claim 1, wherein steps of claim 1 are provided by a service provider on a subscription, advertising, and/or fee basis.

8. The method of claim 1, further comprising deploying a system for aggregating bandwidth from a plurality of cellular connections, comprising providing a computer infrastructure operable to perform the steps of claim 1.

9. A computer program product for aggregating bandwidth from a plurality of cellular connections, the computer program product comprising a computer readable storage medium having program instructions embodied therewith, the program instructions executable by a user device to cause the user device to:
- receive an instruction to aggregate cellular bandwidth of the user device with the cellular bandwidth of one or more participating user devices;
- append a shared character string to a network name of the user device based on receiving the instruction;
- host a wireless local area network (WLAN) after appending the shared character string;
- disconnect devices from the WLAN except for a particular one of the one or more participating user devices having a network name with the shared character string and a current sequence character string;
- scan for WLANs hosted by other devices;
- identify one or more WLAN networks hosted by the other devices with the network names having the shared character string;
- connect to a particular WLAN network, of the one or more WLAN networks via a WLAN interface of the user device; and
- combine bandwidth from a cellular interface of the user device with the bandwidth from the WLAN interface of the user device, wherein the WLAN hosted by the user device provides a sum of the bandwidth from the WLAN interface and the cellular interface,
- increment the sequence character string;
- append the incremented sequence character string after the appended shared character string to the network name of the user device, wherein connecting to the particular WLAN is based on appending the incremented sequence character.

10. The computer program product of claim 9, wherein the program instructions further cause the user device to refuse additional connections to the WLAN hosted by the user device based on disconnecting the devices from the WLAN except for the particular one of the one or more participating user devices.

11. The computer program product of claim 9, wherein the program instructions further cause the user device to select the particular WLAN network based on signal strength associated with the particular WLAN network, wherein connecting to particular WLAN network includes selecting the particular WLAN network.

12. The computer program product of claim 9, wherein the program instructions further cause the user device to randomly select the particular WLAN network, wherein connecting to particular WLAN network includes randomly selecting the particular WLAN network.

13. The computer program product of claim 9, wherein the program instructions further cause the user device to generate the shared character string by randomly selecting characters or receiving a custom character string from a user of the first user device, wherein appending the shared character string is based on generating the shared character string.

14. The computer program product of claim 13, wherein the program instructions further cause the user device to send the shared character string to the one or more participating user devices.

15. The computer program product of claim 9, wherein the program instructions further cause the user device to receive the shared character string from a particular one of the one or more participating user devices, wherein appending the shared character string is based on receiving the shared character string.

16. A computer program product for aggregating bandwidth from a plurality of cellular connections, the computer program product comprising a computer readable storage medium having program instructions embodied therewith, the program instructions executable by a user device to cause the user device to:
- receive an instruction to aggregate cellular bandwidth of the user device with the cellular bandwidth of one or more participating user devices;
- append a shared character string to a network name of the user device based on receiving the instruction;
- host a wireless local area network (WLAN) after appending the shared character string;
- disconnect devices from the WLAN except for a particular one of the one or more participating user devices having a network name with the shared character string and a current sequence character string;
- scan for WLANs hosted by other devices;
- identify one or more WLAN networks hosted by the other devices with the network names having the shared character string;
- connect to a particular WLAN network, of the one or more WLAN networks via a WLAN interface of the user device;
- combine bandwidth from a cellular interface of the user device with the bandwidth from the WLAN interface of the user device, wherein the WLAN hosted by the user device provides a sum of the bandwidth from the WLAN interface and the cellular interface; and
- generate the shared character string by randomly selecting characters or receiving a custom character string from a user of the first user device, wherein appending the shared character string is based on generating the shared character string.

17. The computer program product of claim 16, wherein the program instructions further cause the user device to send the shared character string to the one or more participating user devices.

* * * * *